(12) United States Patent
Vandyke et al.

(10) Patent No.: US 10,647,431 B2
(45) Date of Patent: *May 12, 2020

(54) CONTROLLING FLOW OF DRY ICE SUBLIMATION INSIDE A GALLEY CART

(71) Applicant: The Boeing Company, Chicago, IL (US)

(72) Inventors: Bryce A. Vandyke, Snohomish, WA (US); Marcus K. Richardson, Bothell, WA (US); Chao-Hsin Lin, Redmond, WA (US)

(73) Assignee: The Boeing Company, Chicago, IL (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/098,179

(22) Filed: Apr. 13, 2016

(65) Prior Publication Data

US 2016/0229538 A1 Aug. 11, 2016

Related U.S. Application Data

(62) Division of application No. 14/202,495, filed on Mar. 10, 2014, now Pat. No. 9,340,288.

(51) Int. Cl.
*B64D 11/04* (2006.01)
*F25D 3/12* (2006.01)
*B62B 3/00* (2006.01)
*B64D 11/00* (2006.01)

(52) U.S. Cl.
CPC ............. *B64D 11/04* (2013.01); *B62B 3/005* (2013.01); *B64D 11/0007* (2013.01); *F25D 3/125* (2013.01); *B62B 3/004* (2013.01); *B62B 2202/67* (2013.01); *B62B 2204/04* (2013.01); *F25D 2600/04* (2013.01)

(58) Field of Classification Search
CPC ..... B64D 11/04; B64D 11/0007; F25D 3/125; F25D 2600/04; F25D 29/001; B62B 3/004; B62B 3/005; A23L 3/363; A23L 3/364; A23L 3/375

See application file for complete search history.

(56) References Cited

U.S. PATENT DOCUMENTS 3,389,946 A * 6/1968 Krugener ................. A23L 3/36
312/236
5,826,441 A 10/1998 Oh
(Continued)

FOREIGN PATENT DOCUMENTS

CN 1756496 A 4/2006
CN 2912353 Y 6/2007
(Continued)

*Primary Examiner* — Emmanuel E Duke
(74) *Attorney, Agent, or Firm* — Felix L. Fischer

(57) ABSTRACT

A galley cart system employs a housing with a door coupled to the housing, the door configured to be moved between a closed position and an open position. A vent plate in the housing communicates between a first compartment and a second compartment. A valve plate adjacent the vent plate is movable from a venting position when the door is in the closed position to a blocking position when the door is in the open position thereby preventing flow communication between the first and second compartment.

15 Claims, 10 Drawing Sheets

(56) References Cited

U.S. PATENT DOCUMENTS

| | | | | |
|---|---|---|---|---|
| 5,975,202 A | * | 11/1999 | Grandi | A47J 39/006 |
| | | | | 165/48.1 |
| 6,141,982 A | * | 11/2000 | Schwarz | F25D 3/06 |
| | | | | 62/201 |
| 7,025,121 B2 | * | 4/2006 | Whitehead | A47J 39/003 |
| | | | | 165/41 |
| 2006/0218963 A1 | | 10/2006 | Elias | |
| 2011/0277489 A1 | * | 11/2011 | Schalla | A47B 31/02 |
| | | | | 62/89 |

FOREIGN PATENT DOCUMENTS

| | | |
|---|---|---|
| CN | 102762126 A | 10/2012 |
| DE | 19919934 A1 | 11/2000 |
| EP | 2650216 A1 | 10/2013 |
| JP | S35-008374 Y | 4/1935 |
| JP | S56-023386 U | 7/1979 |
| JP | S60-048072 U | 4/1985 |
| JP | H02-137678 U | 11/1990 |
| JP | H11-079261 A | 3/1999 |
| JP | 2005296338 A | 10/2005 |

\* cited by examiner

CONTROLLING FLOW OF DRY ICE SUBLIMATION INSIDE A GALLEY CART

REFERENCE TO RELATED APPLICATIONS

This application is a divisional of application Ser. No. 14/202,495 filed on Mar. 10, 2014 entitled CONTROLLING FLOW OF DRY ICE SUBLIMATION INSIDE A GALLEY CART having a common assignee with the present application, the disclosure of which are incorporated herein by reference.

BACKGROUND INFORMATION

Field

Embodiments of the disclosure relate generally to the galley cart systems for transportation vehicles and more particularly to an automatically sealing $CO_2$ sublimation flow system allowing flow of sublimate into cooling compartments of the galley cart through apertures with the door in the closed position and sealing the apertures with the door in the open position.

Background

Galley carts employed for food service in transportation vehicles such as aircraft and trains often require cooling contain food and beverages at a temperature that is cooler than a cabin of the vehicle. At least some known carts include or connect to a refrigeration system (a chiller) that provides cool air to an interior volume of the cart to cool the food/beverages. However, the chiller is powered by the vehicle systems, reducing the amount of power available to the vehicle for propulsion, thrust, etc. As such, the chiller is an inefficient draw on the power supply system of the vehicle. Further, such a chiller system adds weight and complexity to the vehicle. Accordingly, some galley carts are configured to contain dry ice that cools the food/beverages as it sublimates. One drawback with the use of dry ice is the carbon dioxide gas ($CO_2$) sublimate that is released. The terms "$CO_2$ gas", "$CO_2$ sublimate", and the like are used to describe the gas produced by the sublimation of $CO_2$ from solid to gas.

At least in aircraft, the Federal Aviation Administration has set forth requirements for the maximum $CO_2$ concentration in a cabin of the aircraft. The sublimation of the dry ice may cause the $CO_2$ concentration to exceed the maximum parts-per-million (ppm). For example, the $CO_2$ gas may escape from the cart into the cabin when the door of the cart is opened in the galley area or in the aisle as food/beverages are served (a transient condition). Further, the $CO_2$ gas may escape from the cart through provided leak paths to ensure that the pressure within the cart does not exceed a maximum threshold as the dry ice sublimates (a steady-state condition). Dry ice, providing $CO_2$ gas sublimation as a coolant, is a commonly available, cost effective and volumetrically efficient refrigerant for such use. However, limiting venting of $CO_2$ gas from the galley carts to avoid undesirable buildup of $CO_2$ in passenger compartments is required.

It is therefore desirable to provide structurally simple and cost effective structure for control of $CO_2$ gas sublimation in galley carts.

SUMMARY

Exemplary embodiments provide a galley cart having a housing with a door coupled to the housing, the door configured to be moved between a closed position and an open position. A vent plate in the housing communicates between a first compartment and a second compartment. A valve plate adjacent the vent plate is movable from a venting position when the door is in the closed position to a blocking position when the door is in the open position thereby preventing flow communication between the first and second compartment.

The embodiments provide a method for shut off of $CO_2$ sublimate in a galley cart. $CO_2$ sublimate from dry ice in a dry ice storage compartment flows through an array of apertures a vent plate. By aligning a mating array of apertures in a valve plate with a mating array of apertures with the vent plate in a first venting position the flow of the $CO_2$ sublimate into a refrigeration compartment is allowed. By opening a door in the cart, the valve plate is urged laterally with respect to the vent plate mis-aligning the mating array of apertures in the valve plate and the array of apertures in the vent plate in a blocking position thereby preventing flow of $CO_2$ sublimate through the apertures in the vent plate.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein provide a galley cart that includes a dry ice chamber at least partially enclosed by a vent plate, which is perforated with a plurality of apertures. A valve plate is positioned adjacent the vent plate and includes a plurality of apertures corresponding to the apertures of the vent plate. The vent plate is fixed, and the valve plate is moveable with respect to the vent plate. More specifically, the valve plate moves between a venting position and a blocking position. The valve plate is, for example, spring-loaded to be biased to the blocking position and moves from the venting position to the blocking position when the cart door opens. When the cart door closes, the door pushes the valve plate to the venting position. In the venting position, the apertures of the valve plate align with the apertures of the vent plate to allow $CO_2$ gas to flow from the dry ice chamber to a refrigerated chamber in the cart. When the valve plate is the blocking position, the material between the apertures of valve plate is aligned with the apertures of the vent plate to close or block the apertures of the vent plate. For exemplary embodiments, the apertures of the valve plate are misaligned with the apertures of the vent plate in the closed position. In some embodiments, the cart includes more than one pair of vent/valve plates. The vent/valve plates help prevent $CO_2$ gas from leaking into the cabin when the cart is in use and the door is open as a transient condition.

The cart further includes at least one pressure relief valve in flow communication with the dry ice chamber. The pressure relief valve opens when an air pressure within the dry ice chamber exceeds a pressure threshold to prevent over-pressurization of the dry ice chamber when the valve plate is in the blocking position and the cart is in the use (transient) or when the valve plate is in the venting position and the cart is in the galley as a steady state condition.

Figure 1:
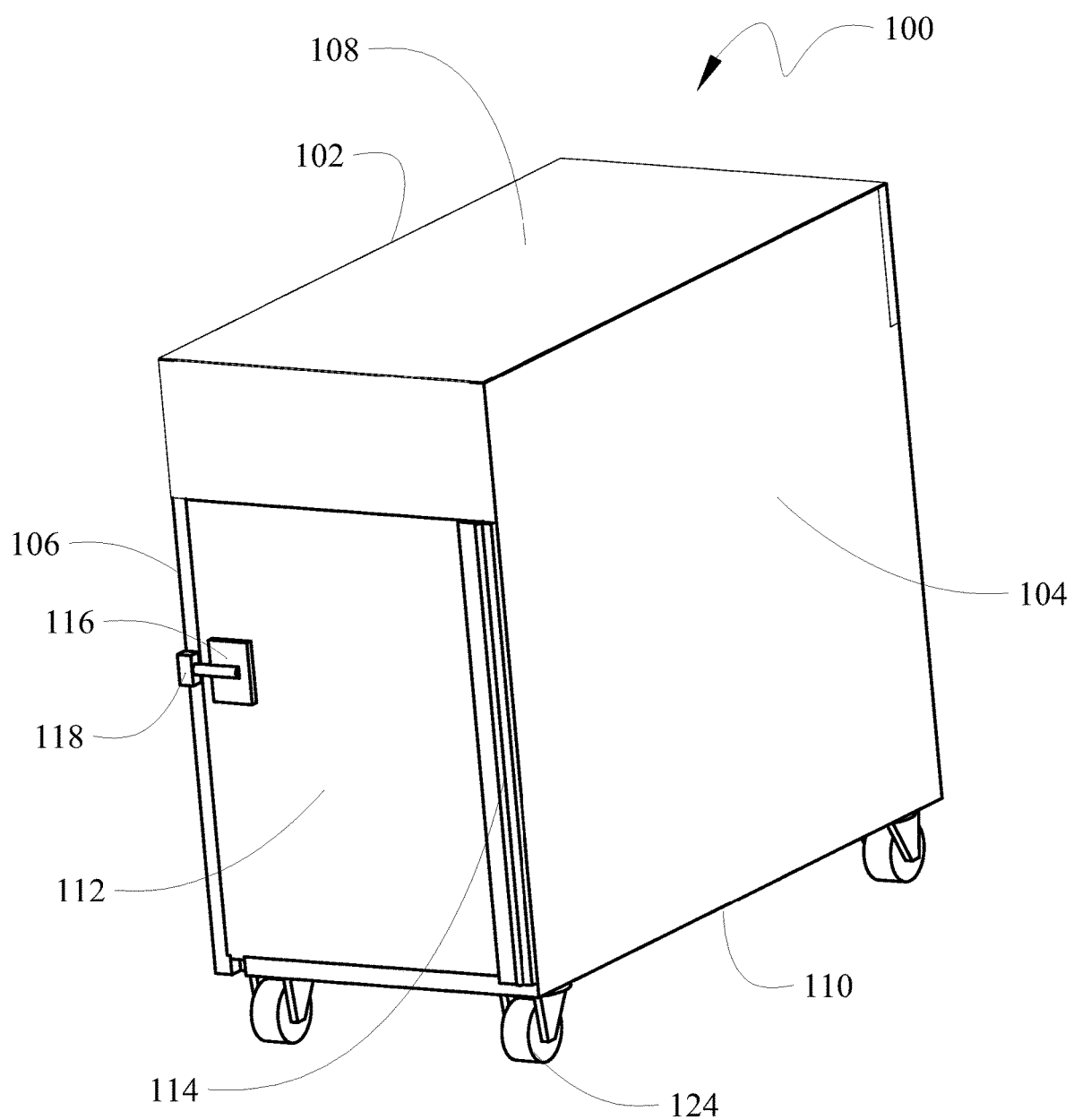
FIG. 1 is a perspective view of an example a galley cart in which the described embodiments may be employed.

Referring to the drawings, FIG. 1 is an isometric view of a galley cart 100 which may be employed in the embodiments disclosed herein. In one aspect of this embodiment, the galley cart 100 includes a housing 102. In the illustrated embodiment, the housing 102 has a first side 104, a second side 106, a top 108, and a bottom 110 defining an interior cavity 111 (as seen FIG. 2). The galley cart 100 further includes a door 112 positioned on one end of the housing 102. The doors 112 typically include one or more hinges 114 and a latch 116. The hinges 114 pivotally attach the doors 112 to the housing 102. The latch 116 can be configured to releasably engage corresponding receivers 118 attached to the housing 102 when the door 112 is in closed positions as illustrated in FIG. 1.

By disengaging the latch 116 from the corresponding receiver 118, the door 112 can be opened outwardly providing access to the interior cavity 111 of the housing 102. Wheels or casters 124 allow the galley cart to be easily maneuvered within the service areas and aisles of the aircraft.

Figure 2:
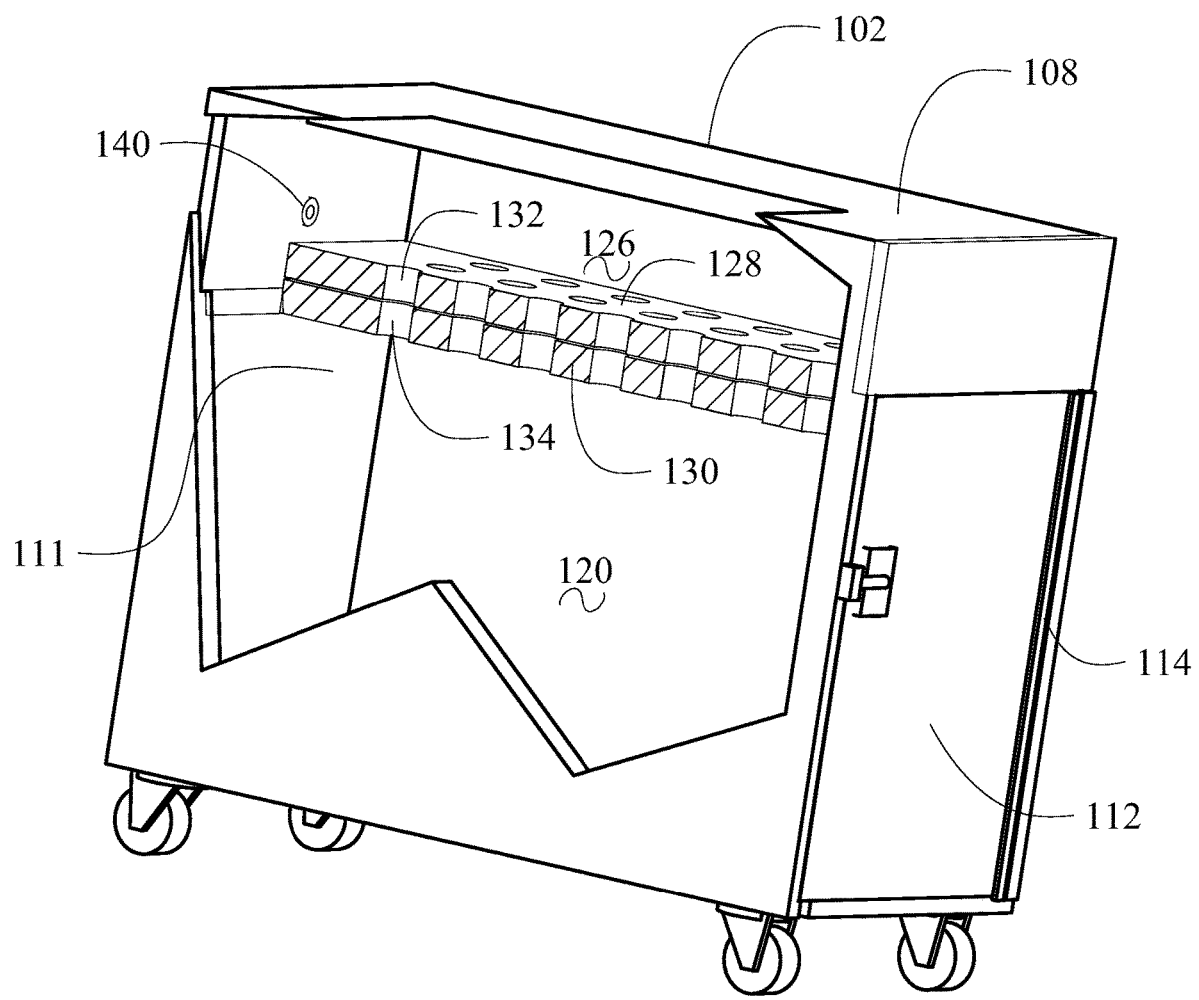
FIG. 2 is a side section view of a first embodiment of the galley cart with the door in a closed position and the $CO_2$ sublimation apertures in an open position.
Figure 3:
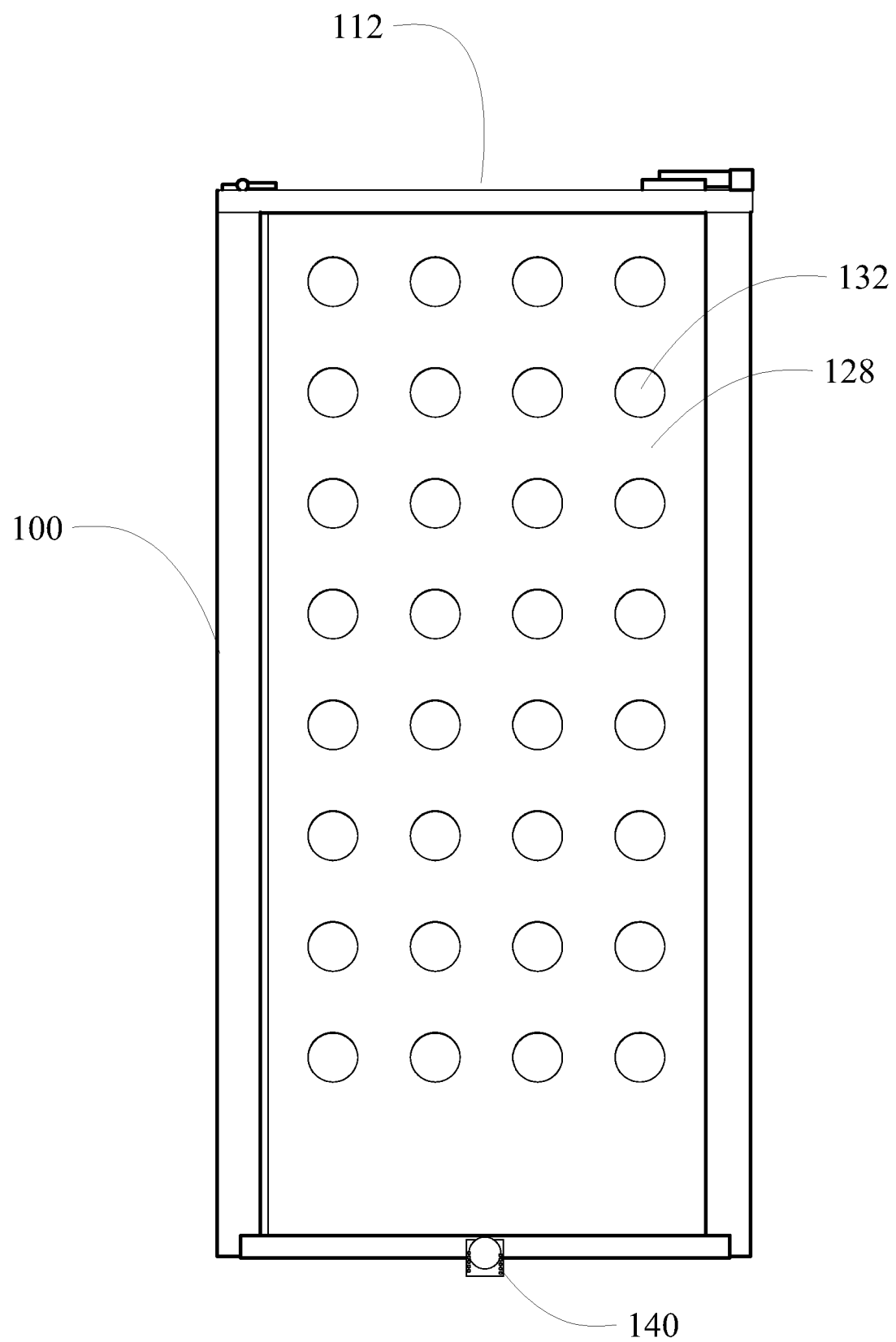
FIG. 3 is a top section view of the galley cart as configured in FIG. 2.

As seen in FIG. 2, a storage compartment 126 for dry ice for cooling is provided in an upper portion of the interior cavity 111 of cart housing 102 and a refrigeration compartment 120 is provided in a lower portion of the interior cavity. A cooperating vent plate 128 and an immediately adjacent valve plate 130 are integrated into or form a bottom of the storage compartment 126 (thickness dimensions of the vent plate and valve plate are exaggerated for clarity). The vent plate 128 has an array of apertures 132 in communication with the storage compartment 126 and the valve plate 130 has a mating array of apertures 131. As shown in FIG. 2, with the door 112 closed the valve plate 130 and vent plate 128 are aligned in a venting position such that the array of apertures 132 in the vent plate are aligned with the mating array of apertures 134 in the valve plate, as also seen in FIG. 3, allowing sublimated $CO_2$ gas from the dry ice in storage compartment 126 to flow into the refrigerated compartment 120 for cooling of food or beverage items stored therein. The valve plate 130 is movable relative to the vent plate 128 to allow displacement of the mating array of apertures 134 from the array of apertures 132 in the vent plate 128.

Figure 4:
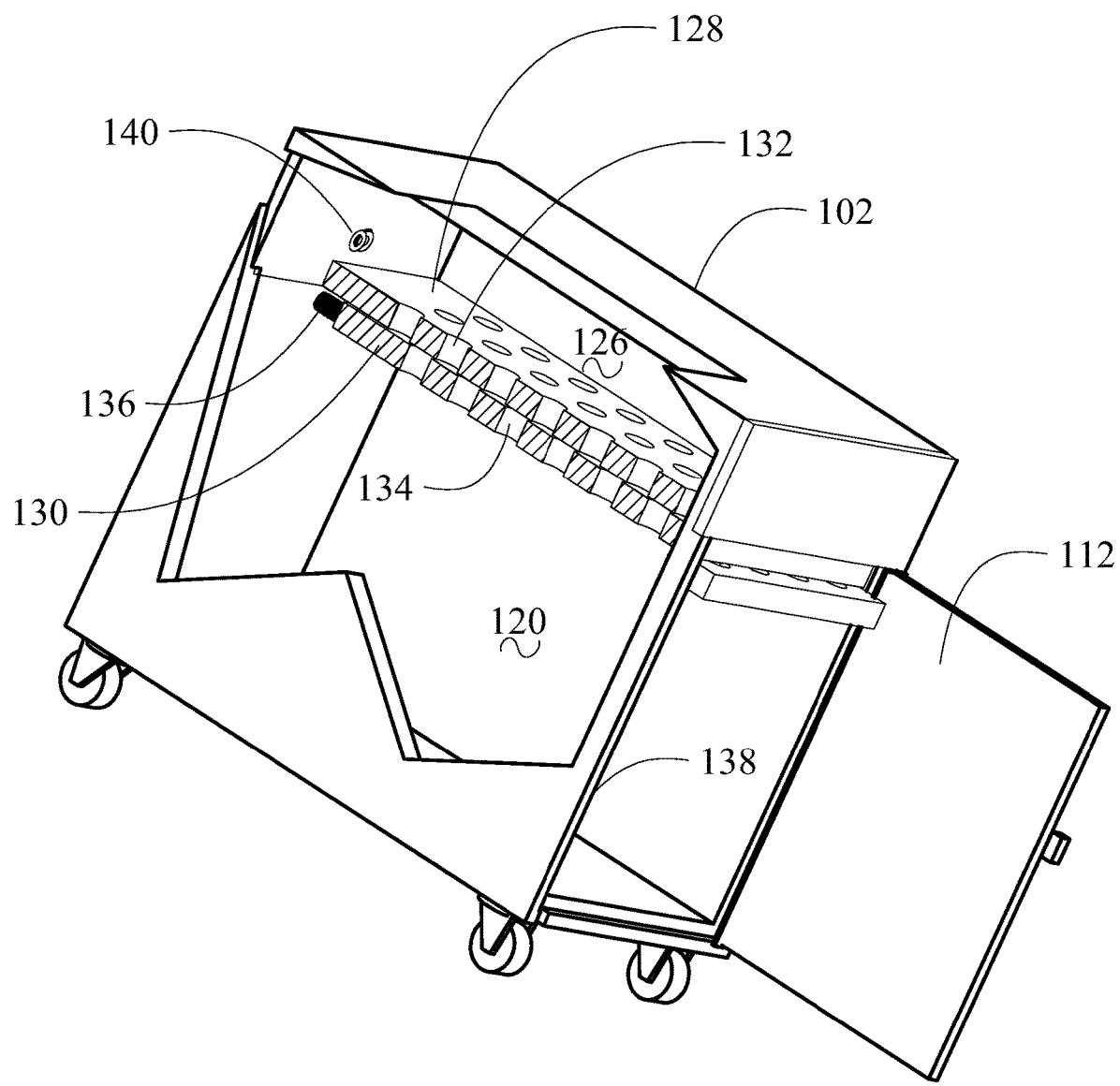
FIG. 4 is amide section view of the first embodiment of the galley cart with the door in an open position and the $CO_2$ sublimation apertures in a closed position.
Figure 5:
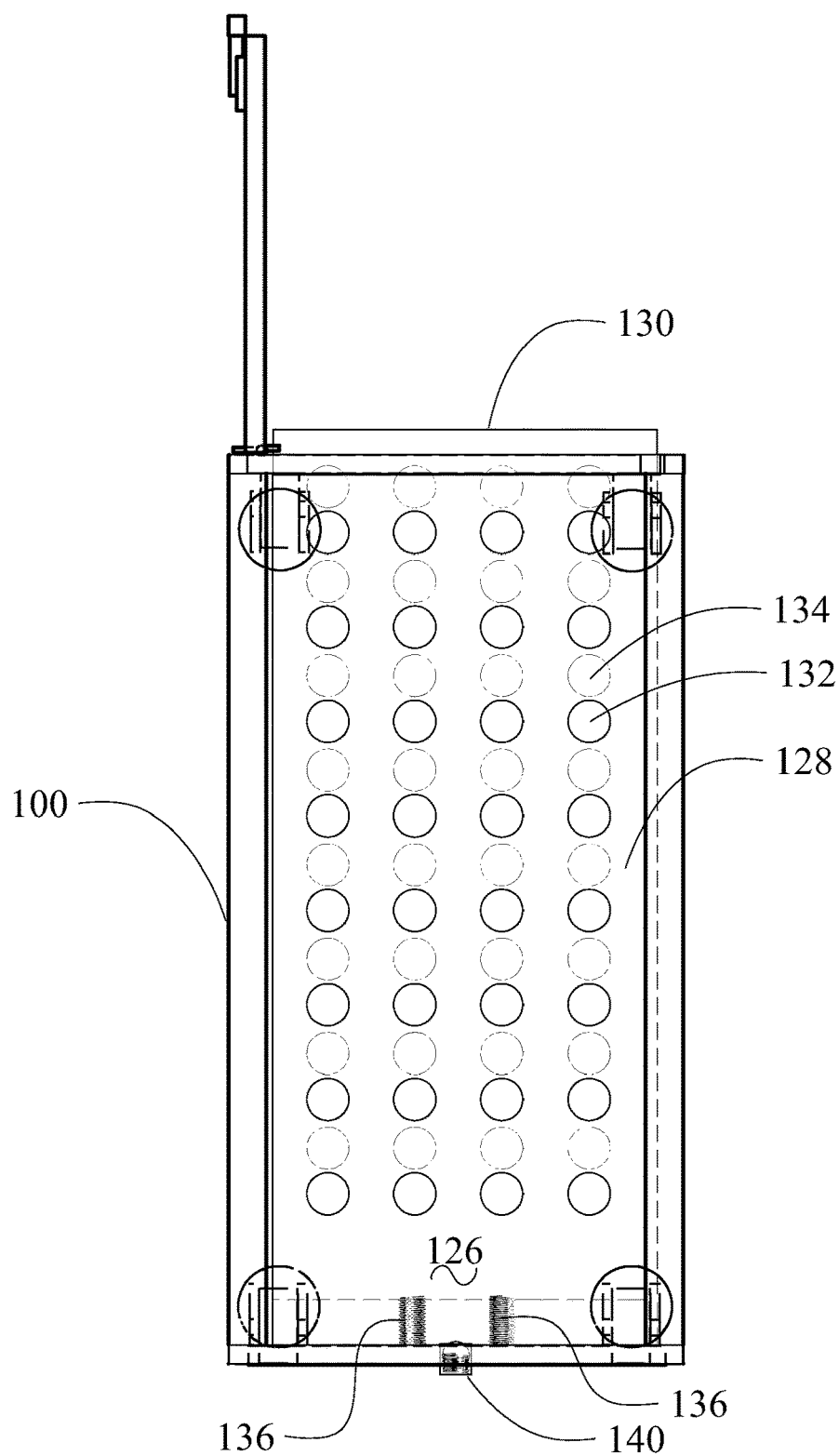
FIG. 5 is a top section view of the galley cart as configured in FIG. 4.

As shown in FIG. 4, when the door 112 of the cart 100 is placed in an open position while in use for serving food or beverages from the cart 100, one or more springs 136, or other biasing mechanisms or resilient elements, urge the valve plate outward through the door opening 138. This movement to a blocking position displaces the mating array of apertures 134 from alignment with the array of apertures 132 sealing the storage compartment, as seen in FIG. 5, to preclude $CO_2$ sublimate from flowing into the refrigerated compartment 120 from the dry ice storage compartment 126 and out the door opening 138 into the passenger cabin.

A relief valve 140 is provided to vent $CO_2$ gas from the dry ice storage compartment 126 in the event of an excess pressure buildup while the vent plate and valve plate are misaligned in the blocking position preventing flow of $CO_2$ sublimate into the refrigeration compartment 120. In exemplary embodiments a spring loaded ball valve may be employed.

Figure 6:
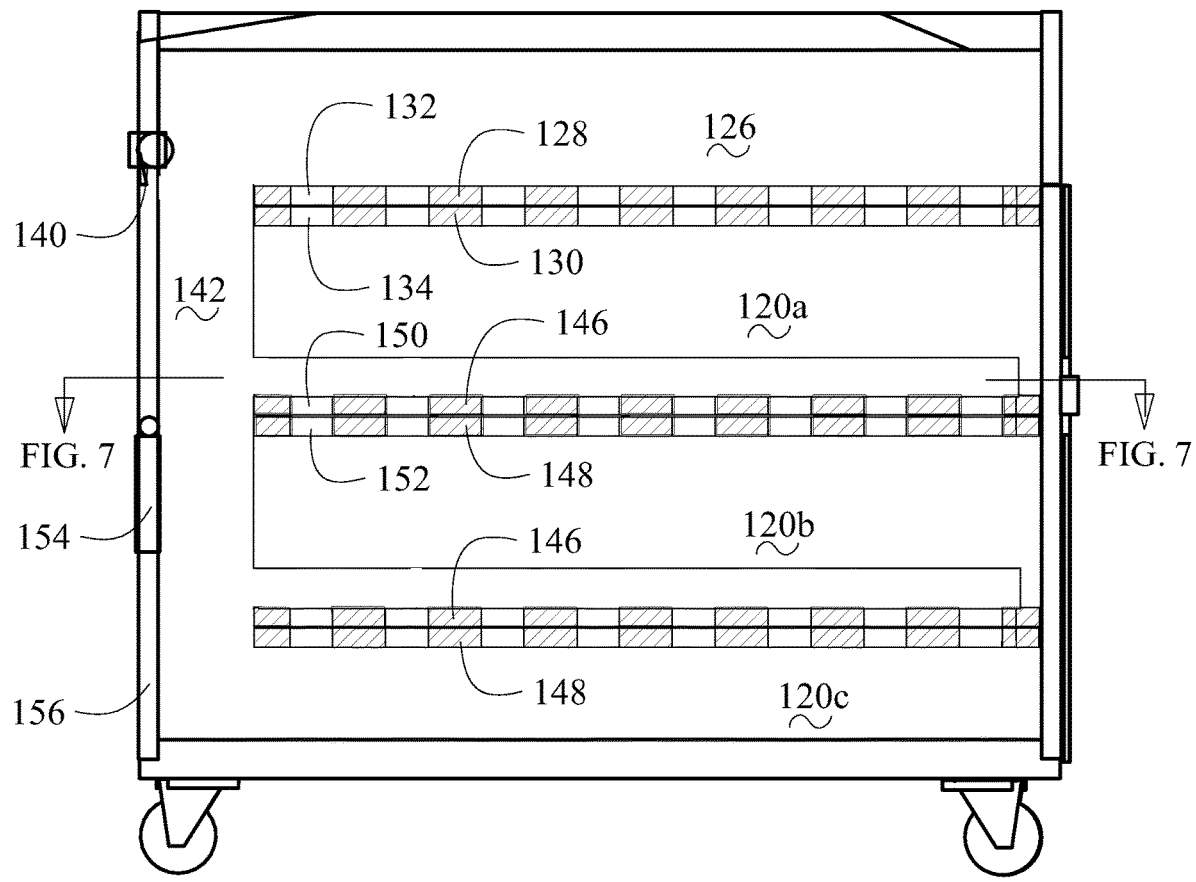
FIG. 6 is a side section view of a second embodiment of the galley cart with the door in a closed position and the $CO_2$ sublimation apertures in an open position.
Figure 7:
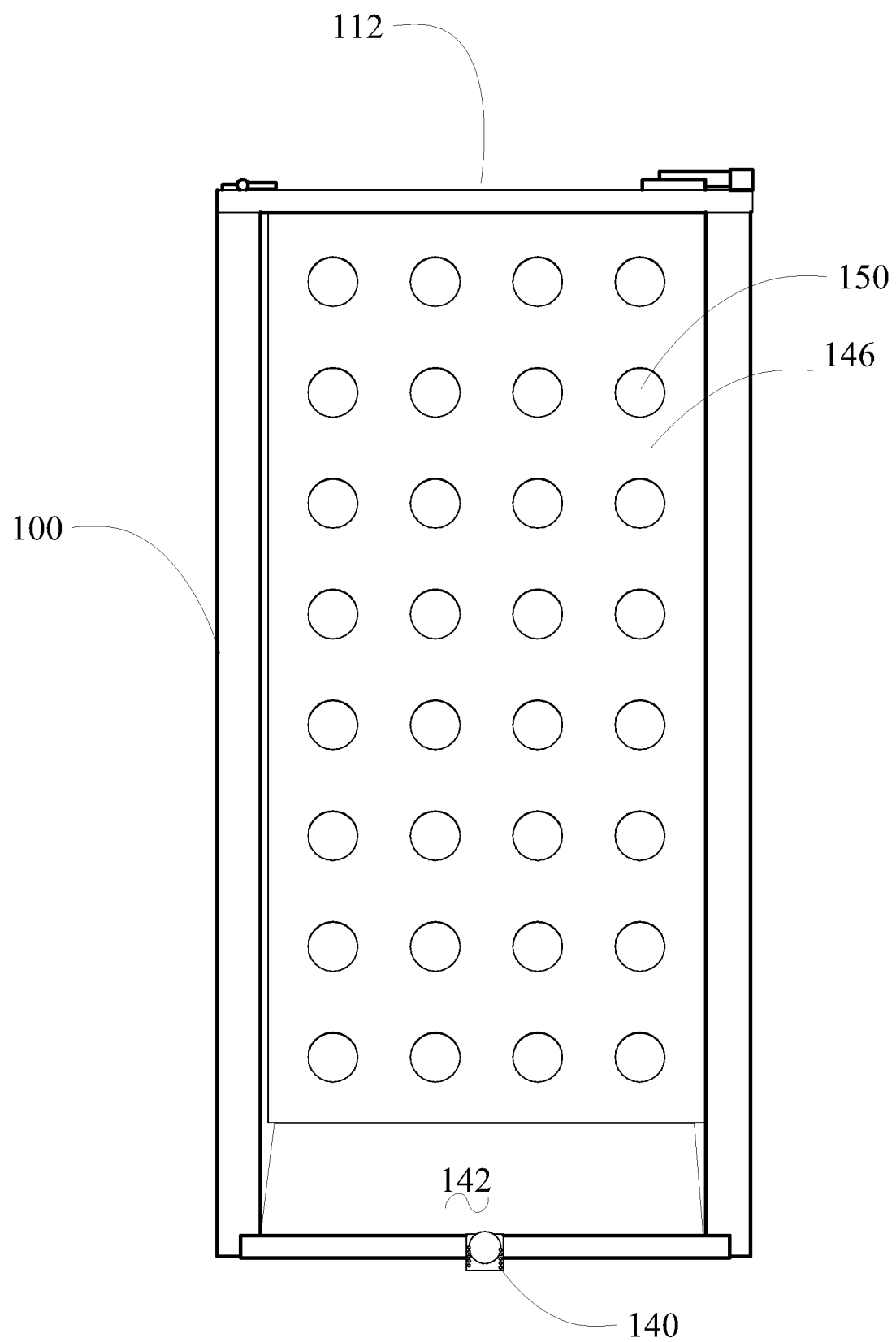
FIG. 7 is a top section view of the galley cart as configured in FIG. 6.

FIG. 6 demonstrates an alternative embodiment employing a $CO_2$ sublimation channel network for controlled distribution of the $CO_2$ gas throughout the refrigeration compartment 120. A vertical distribution channel 142 extends from the dry ice storage compartment 126 and horizontal conduits 144 extend from the vertical distribution channel forming a sublimation volume to carry the $CO_2$ sublimate. For each horizontal conduit 144, a mating vent plate 146 and valve plate 148 are employed for control of $CO_2$ sublimate flow from the horizontal conduit. As previously described with respect to vent plate 128 and valve plate 130, the additional vent plates 146 and valve plates 148 are aligned in a venting position such that an array of apertures 150 in the vent plate are aligned with the mating array of apertures 152 in the valve plate, as also seen in FIG. 7, allowing sublimated $CO_2$ gas from the dry ice in respective horizontal conduit 144 to flow into a segment of the refrigerated compartment 120a, 120b or 120c for cooling of food or beverage items stored therein. The valve plates 148 are movable relative to the vent plates 146 to allow displacement of the mating arrays of apertures 152 from the arrays of apertures 150 in the vent plates 146.

Figure 8:
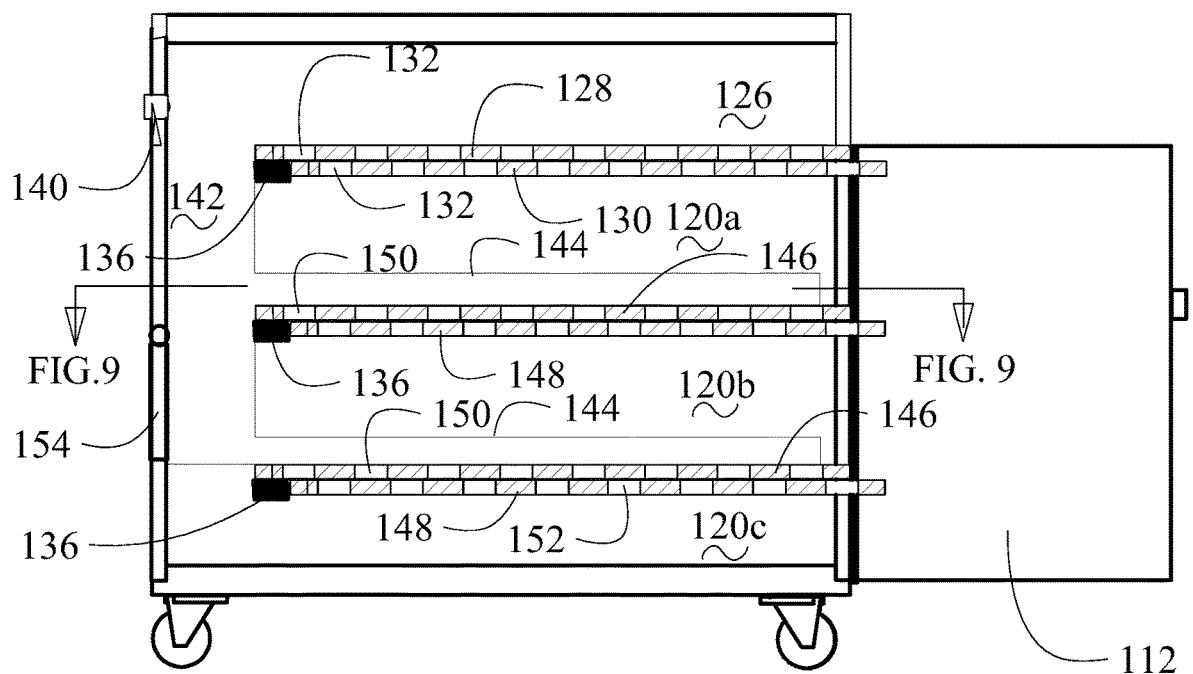
FIG. 8 is a side section view of the second embodiment of the galley cart with the door in an open position and the $CO_2$ sublimation apertures in a closed position.
Figure 9:
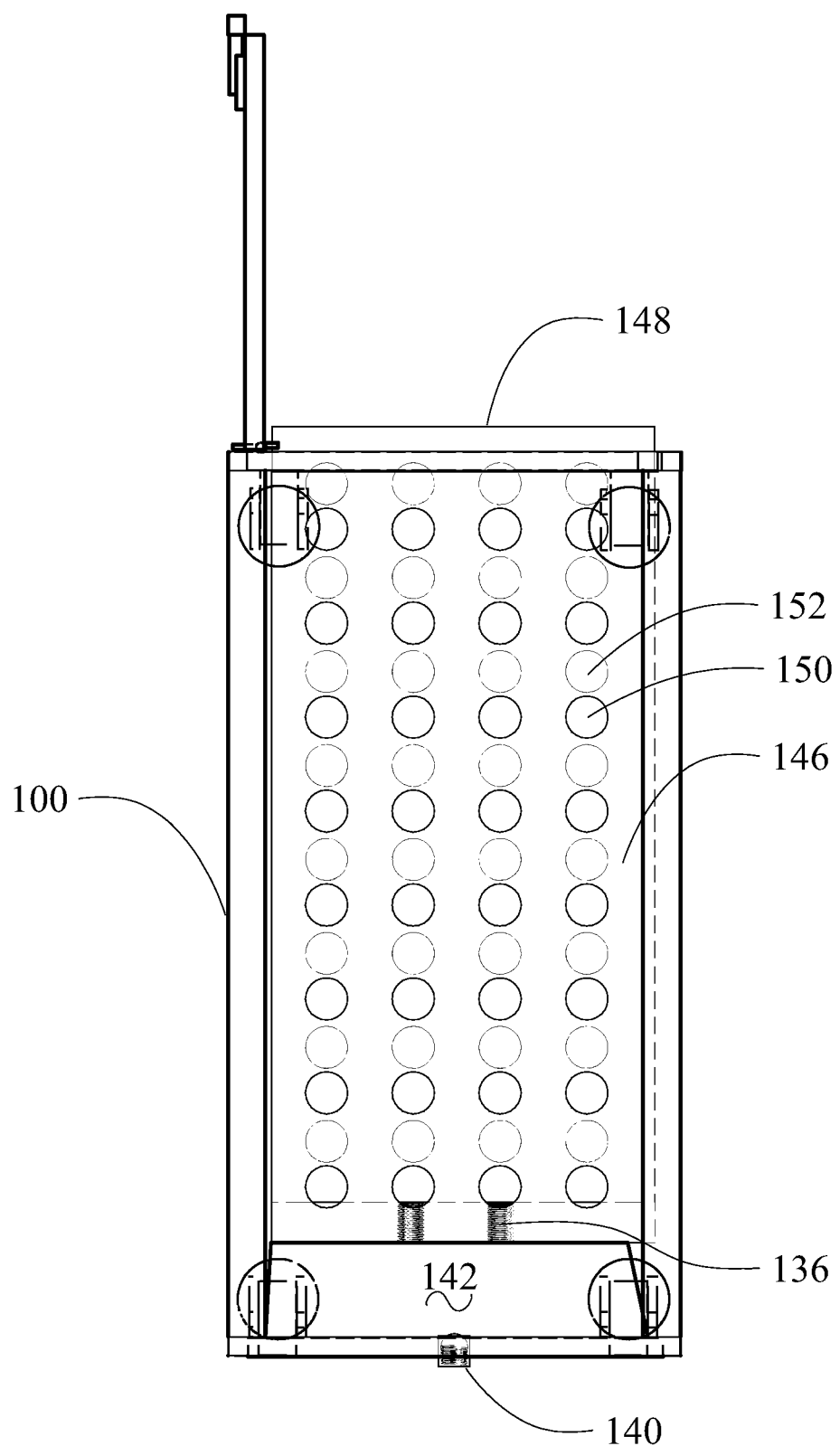
FIG. 9 is a top section view of the galley cart as configured in FIG. 8; and, FIG. 10 is a flow chart of a $CO_2$ capture method enabled by the disclosed embodiments.

As shown in FIG. 8, when the door 112 of the cart 100 is opened while in use for serving food or beverages from the cart 100, one or more springs 136, or other biasing mechanisms or resilient elements, associated with each valve plate 130, 148 urge the valve plate outward through the door opening 138. This movement to a blocking position displaces the mating array of apertures 134, 152 from alignment with the array of apertures 132, 150 sealing the storage compartment, as seen in FIG. 9, to preclude $CO_2$ sublimate from flowing into the refrigerated compartment segments 120a, 120b or 120c from the dry ice storage compartment 126 and horizontal conduits 144 through vertical distribution channel 142 and out the door opening 138 into the passenger cabin.

The horizontal conduits may additionally act as storage shelves for the food or beverage items stored within the refrigerated compartment segments 120a, 120b and 120c of the cart 100. As with the initially described embodiment, a relief valve 140 is provided to vent $CO_2$ gas from the dry ice storage compartment 126 in the event of an excess pressure buildup while the vent plates and valve plates are misaligned in the blocking position preventing flow of $CO_2$ sublimate into the refrigeration compartment 120. A vent door 154 may be incorporated in a rear wall 156 of the housing 102 as shown in FIGS. 6 and 8 to allow venting of $CO_2$ sublimate when the cart is engaged with a galley vent system as described in copending application Ser. No. 14/202,366 filed Mar. 10, 2014 entitled Dry Ice Draw Through Galley Cooling published as US Pub. No. 2015-0251761. This added vent door configuration could also be applied to the first embodiment described above with respect to FIGS. 1-5.

Figure 10:
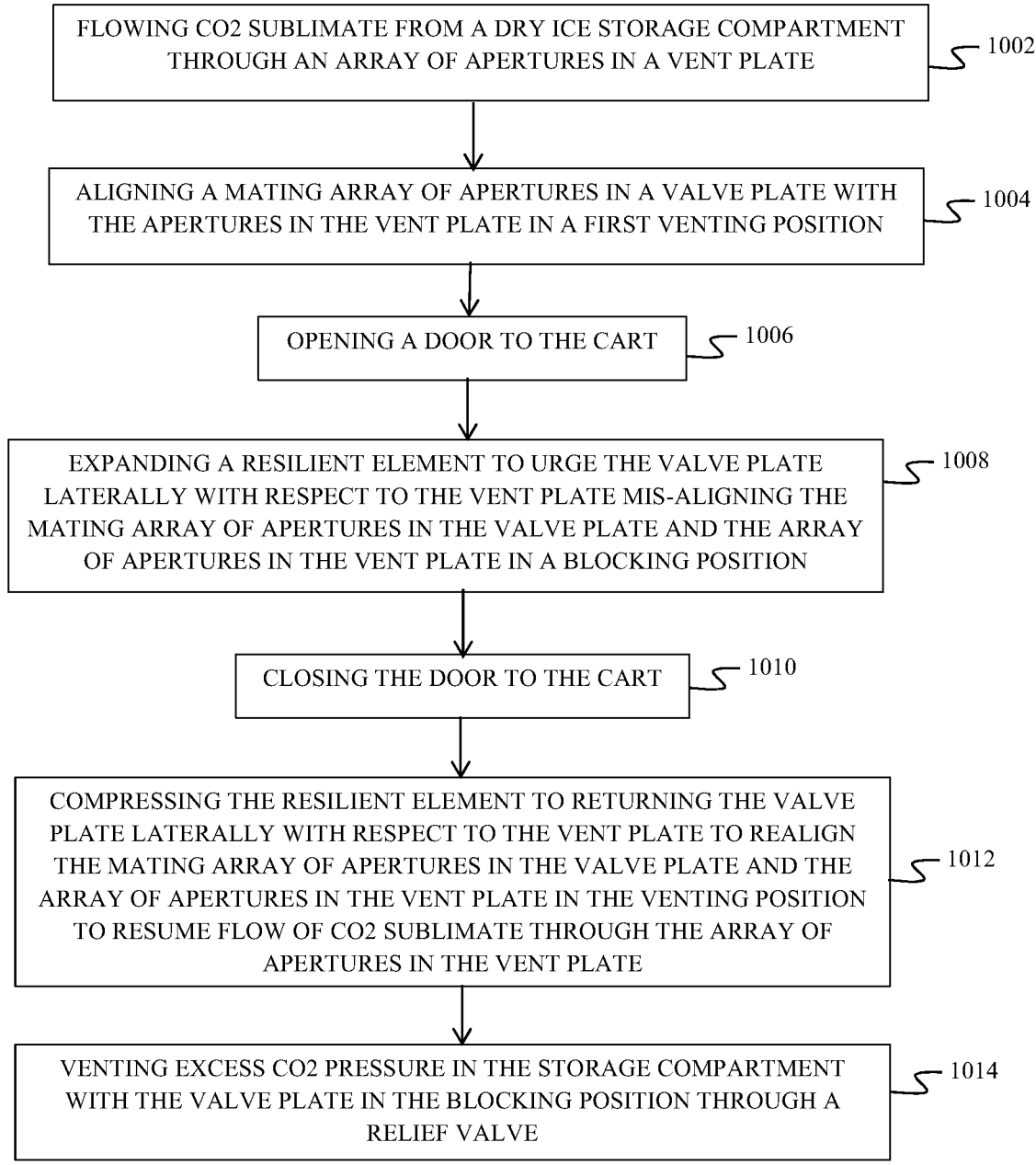

The embodiments disclosed provide a method for shut off of $CO_2$ sublimate flow from the dry ice storage compartment of a galley cart into the refrigeration compartment in the cart as shown in FIG. 10. $CO_2$ gas sublimated from dry ice for cooling flows from a dry ice storage compartment through an array of apertures a vent plate, step 1002. A valve plate having a mating array of apertures aligns the mating array of apertures with the vent plate array of apertures in a first venting position to allow the flow of the $CO_2$ sublimate into the refrigeration compartment, step 1004. Upon opening a door in the cart, step 1006, a resilient element is expanded to urge the valve plate laterally with respect to the vent plate mis-aligning the mating array of apertures in the valve plate and the array of apertures in the vent plate in a blocking position, step 1008, thereby preventing flow of $CO_2$ sublimate through the apertures in the vent plate. Closing the door, step 1010, urges the valve plate to compress the resilient element returning the valve plate in lateral motion for alignment of the mating array of apertures and array of apertures in the vent plate, step 1012, thereby resuming flow of $CO_2$ sublimate through the array of apertures in the vent plate. Excess $CO_2$ gas pressure in the storage compartment with the valve plate in the blocking position is vented through a relief valve, step 1014.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A galley cart comprising:
a housing defining a cavity;
a door coupled to the housing, the door configured to be moved between a closed position and an open position;
a plurality of vent plates in the housing to communicate between a sublimation volume and a plurality of refrigeration compartments; and
a valve plate adjacent each vent plate, said valve plate movable from a venting position when the door is in the closed position to a blocking position when the door is in the open position; and wherein the sublimation volume includes a vertical distribution channel and a plurality of horizontal conduits, each horizontal conduit having an associated one of the plurality of vent plates and an associated valve plate.

2. The galley cart as defined in claim 1 wherein the sublimation volume includes a dry ice storage compartment.

3. The galley cart as defined in claim 1 further comprising a relief valve in the storage compartment.

4. The galley cart as defined in claim 1 further comprising a vent door communicating with the vertical distribution channel.

5. The galley cart as defined in claim 1 further comprising at least one resilient element urging each of the plurality of valve plates into the blocking position when the door is moved to the open position.

6. The galley cart as defined in claim 1 wherein each of the plurality of vent plates incorporates an array of apertures and each valve plate incorporates a mating array of apertures, said valve plate aligning the mating array of apertures with the array of apertures in an adjacent vent plate in the venting position and misaligning the mating array of apertures from the array of apertures in the adjacent vent plate in the blocking position.

7. The galley cart as defined in claim 6 wherein aligning of the mating array of apertures with the array of apertures in the vent plate in the venting position configures the vent plate for flow of sublimating $CO_2$ gas from the horizontal conduits to refrigeration compartments.

8. The galley cart as defined in claim 1 further comprising a relief valve in the housing.

9. A galley cart employing dry ice sublimation for cooling, said galley cart comprising:
a housing defining a cavity;
a door coupled to the housing, the door configured to be moved between a closed position and an open position;
a dry ice storage compartment;
a vertical distribution channel extending form the dry ice storage compartment;
a plurality of horizontal conduits extending from the vertical distribution channel;
a plurality of vent plates in the housing, each vent plate associated with a refrigeration compartment segment and in communication with an associated one of the plurality of horizontal conduits;
a valve plate adjacent each vent plate, said valve plate movable from a venting position when the door is in the closed position to a blocking position when the door is in the open position, said venting position enabling sublimated $CO_2$ flow from the associated horizontal conduit into the associated refrigeration compartment segment.

10. The galley cart as defined in claim 9 further comprising a vent door communicating with the vertical distribution channel.

11. The galley cart as defined in claim 10 wherein the vent door is adapted for fluid communication with a galley vent system.

12. The galley cart as defined in claim 9 further comprising at least one resilient element urging each of the plurality of valve plates into the blocking position when the door is moved to the open position.

13. The galley cart as defined in claim 9 wherein each of the plurality of vent plates incorporates an array of apertures and each valve plate incorporates a mating array of apertures, said valve plate aligning the mating array of apertures with the array of apertures in an adjacent vent plate in the venting position and misaligning the mating array of apertures from the array of apertures in the adjacent vent plate in the blocking position.

14. The galley cart as defined in claim 13 wherein aligning of the mating array of apertures with the array of apertures in the vent plate in the venting position configures the vent plate for flow of sublimating $CO_2$ gas from the horizontal conduits to the refrigeration compartment segments.

15. The galley cart as defined in claim 9 further comprising a relief valve in the housing.

* * * * *